United States Patent
Liu

(10) Patent No.: US 11,582,664 B2
(45) Date of Patent: Feb. 14, 2023

(54) CELL SELECTION OR RESELECTION METHOD AND APPARATUS, AND TERMINAL

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/349,716

(22) Filed: Jun. 16, 2021

(65) Prior Publication Data
US 2021/0314836 A1 Oct. 7, 2021

Related U.S. Application Data

(63) Continuation of application No. PCT/CN2018/122181, filed on Dec. 19, 2018.

(51) Int. Cl.
| | |
|---|---|
| H04W 36/08 | (2009.01) |
| H04W 36/14 | (2009.01) |
| H04W 36/36 | (2009.01) |
| H04W 48/18 | (2009.01) |
| H04W 48/20 | (2009.01) |

(52) U.S. Cl.
CPC ........ *H04W 36/08* (2013.01); *H04W 36/14* (2013.01); *H04W 36/36* (2013.01); *H04W 48/18* (2013.01); *H04W 48/20* (2013.01)

(58) Field of Classification Search
CPC ..... H04W 36/08; H04W 36/14; H04W 36/36; H04W 48/18; H04W 48/20; H04W 48/16
See application file for complete search history.

(56) References Cited

U.S. PATENT DOCUMENTS

| | | | |
|---|---|---|---|
| 9,155,034 B1 * | 10/2015 | Xue | H04W 48/18 |
| 2008/0227447 A1 | 9/2008 | Jeong et al. | |
| 2010/0029283 A1 | 2/2010 | Iwamura | |
| 2011/0269460 A1 | 11/2011 | Dalsgaard et al. | |
| 2012/0028639 A1 | 2/2012 | Jeong et al. | |
| 2012/0295616 A1 | 11/2012 | Jeong et al. | |
| 2014/0038610 A1 | 2/2014 | Jeong et al. | |
| 2014/0321406 A1 | 10/2014 | Marinier et al. | |
| 2017/0201925 A1 | 7/2017 | Chong et al. | |

(Continued)

FOREIGN PATENT DOCUMENTS

| | | |
|---|---|---|
| CN | 101309499 A | 11/2008 |
| CN | 108966318 A | 12/2018 |
| WO | 2016049819 A1 | 4/2016 |

OTHER PUBLICATIONS

Qualcomm Incorporated et al. "KH1&2: Adressing Open Issues for Solution 1", SA WG2 Meeting #129bis S2-1811733, Nov. 20, 2018 (Nov. 20, 2018), section 6.1.

(Continued)

*Primary Examiner* — Mazda Sabouri
(74) *Attorney, Agent, or Firm* — Perkins Coie LLP

(57) ABSTRACT

Provided in embodiments of the disclosure are a method and apparatus for cell selection or reselection, and a terminal. The method includes that: a terminal performs cell selection or cell reselection based on first information, the first information being Non-Public Network (NPN) related information.

11 Claims, 8 Drawing Sheets

(56) References Cited

U.S. PATENT DOCUMENTS

| | | | | |
|---|---|---|---|---|
| 2018/0007587 | A1* | 1/2018 | Feldman | H04L 65/1016 |
| 2018/0146475 | A1* | 5/2018 | Mitsui | H04W 8/24 |
| 2020/0367201 | A1* | 11/2020 | Cai | H04W 48/10 |
| 2021/0297937 | A1* | 9/2021 | Baek | H04W 48/12 |

OTHER PUBLICATIONS

Qualcomm Incorporated et al. "Overall Evaluation and Conclusion of Key Issue 1 and 2 for Stand-alone Nonpublic Networks", SA WG2 Meeting #129bis S2-1811735, Nov. 20, 2018 (Nov. 20, 2018), section 1.
Samsung et al. "Update of Solution #4: Support of NPN Subscription", SA WG2 Meeting #129Bis S2-1813179, Nov. 29, 2018 (Nov. 29, 2018), section 6.4.
International Search Report in the international application No. PCT/CN2018/122181, dated Jul. 24, 2019.
3GPP TS 38.304 V16.3.0 (Dec. 2020), 3rd Generation Partnership Project; Technical Specification Group Radio Access Network; NR; User Equipment (UE) procedures in Idle mode and RRC Inactive state (Release 16).
3GPP TS 38.331 V16.3.1 (Jan. 2021), 3rd Generation Partnership Project; Technical Specification Group Radio Access Network; NR; Radio Resource Control (RRC) protocol specification (Release 16).
First Office Action of the European application No. 18943466.5, dated Mar. 11, 2022. 11 pages.
Office Action of the Indian application No. 202117029807, dated Mar. 15, 2022. 7 pages with English Translation.
Qualcomm Incorporated et al. "Overall evaluation and conclusion of key issue 1 and 2 for non-public networks deployed as part of a PLMN" S2-1811736; SA WG2 Meeting #129bis; West Palm Beach, USA, Nov. 26-30, 2018. 3 pages.
Qualcomm Incorporated et al: "Updating solution 1", 3GPP DRAFT S2-188912 WA S2-188450 WAS S2-187669; vol. SA WG2, No. Sophia Antipolis, France; Aug. 20, 2018—2018082426 Aug. 2018 (Aug. 26, 2018), XP051537691. 6 pages.
Supplementary European Search Report in the European application No. 18943466.5, dated Nov. 5, 2021. 14 pages.
Second Office Action of the European application No. 18943466.5, dated Sep. 14, 2022. 17 pages.
First Office Action of the Chinese application No. 202110799378.2, dated Sep. 21, 2022. 16 pages with English translation.
Intel, KI1, 2_Update to Solution#3, 3GPP TSG SA WG2#129BIS S2-1812019, 3GPP, Nov. 20, 2018. 6 pages.
Qualcomm Incorporated, Update to Solution 1 and Solution 2, 3GPP TSG SA WG2#129 S2-18111347, 3GPP, Oct. 17, 2018. 7 pages.
ZTE, Sanechips, Discussion on Network Identities in NTN, 3GPP TSG RAN WG3#101Bis R3-185611, 3GPP, Sep. 29, 2018. 5 pages.
Intel, Nokia, Nokia Shanghai Bell, Update to Solution#3, 3GPP TSG SA WG2#129 S2-1810404, 3GPP, Oct. 9, 2018. 5 pages.
First Office Action of the Japanese application No. 2021-535685, dated Oct. 18, 2022. 6 pages with English translation.
Second Office Action of the Chinese application No. 202110799378.2, dated Dec. 6, 2022. 12 pages with English translation.

* cited by examiner

CELL SELECTION OR RESELECTION METHOD AND APPARATUS, AND TERMINAL

CROSS-REFERENCE TO RELATED APPLICATION

This is a continuation application of International Patent Application No. PCT/CN2018/122181 filed on Dec. 19, 2018, the content of which is incorporated herein by reference in its entirety.

TECHNICAL FIELD

Embodiments of the disclosure relate to the technical field of mobile communications, and more particularly to a method and apparatus for cell selection or reselection, and a terminal.

BACKGROUND

The concept of Non-Public Network (NPN) is introduced to the Release 16 (R16) of the $5^{th}$ Generation (5G). The NPN includes a type-a network and a type-b network that respectively correspond to a private network supporting privation of a Public Land Mobile Network (PLMN) and a private network of a non-3rd Generation Partnership Project (3GPP) public network. If User Equipment (UE) is not a contract-signing user of the NPN, the user cannot reside in the NPN and/or use the NPN for normal communication. In present procedures of New Radio (NR), the UE does not know whether a present cell is an NPN cell or whether a selected cell is an NPN cell during cell selection or reselection. In addition, even if the UE knows NPN information of a candidate cell, the UE does not consider whether the UE itself can support the NPN and/or whether the candidate cell is an NPN cell during cell selection or cell reselection according to the existing procedures. This may result in that after residing in a cell, the UE has to reselect another cell right away because that cell is an NPN cell, thereby wasting a great number of computing resources and consuming the electricity.

SUMMARY

The embodiments of the disclosure provide a method and apparatus for cell selection or reselection, and a terminal.

The method for cell selection or reselection provided by the embodiments of the disclosure may include that:

a terminal performs cell selection or cell reselection based on first information, the first information being NPN related information.

The apparatus for cell selection or reselection provided by the embodiments of the disclosure may include a cell selection or reselection unit.

The cell selection or reselection unit is configured to perform cell selection or cell reselection based on first information, the first information being NPN related information.

The terminal provided by the embodiments of the disclosure may include a processor and memory. The memory is configured to store a computer program, and the processor is configured to call and run the computer program stored in the memory to implement the above method for cell selection or reselection.

A chip provided by the embodiments of the disclosure is configured to implement the above method for cell selection or reselection.

Specifically, the chip may include a processor configured to call and run a computer program in memory to enable a device installed with the chip to implement the above method for cell selection or reselection.

A computer-readable storage medium provided by the embodiments of the disclosure is configured to store a computer program, the computer program enabling a computer to implement the above method for cell selection or reselection.

A computer program product provided by the embodiments of the disclosure may include computer program instructions enabling a computer to implement the above method for cell selection or reselection.

A computer program provided by the embodiments of the disclosure runs in a computer to enable the computer to implement the above method for cell selection or reselection.

According to the solutions for cell selection or cell reselection in an NPN supported scenario provided by the embodiments of the disclosure, cell selection or cell reselection may be performed based on NPN related information, so that frequent cell selection or cell reselection may be avoided, the power of a terminal is saved, and the waste of computing resources is reduced.

BRIEF DESCRIPTION OF THE DRAWINGS

The accompanying drawings are described here to provide a further understanding of the disclosure, and form a part of the disclosure. The schematic embodiments and description of the disclosure are adopted to explain the disclosure, and do not form improper limits to the disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a 5G system.

Figure 1:
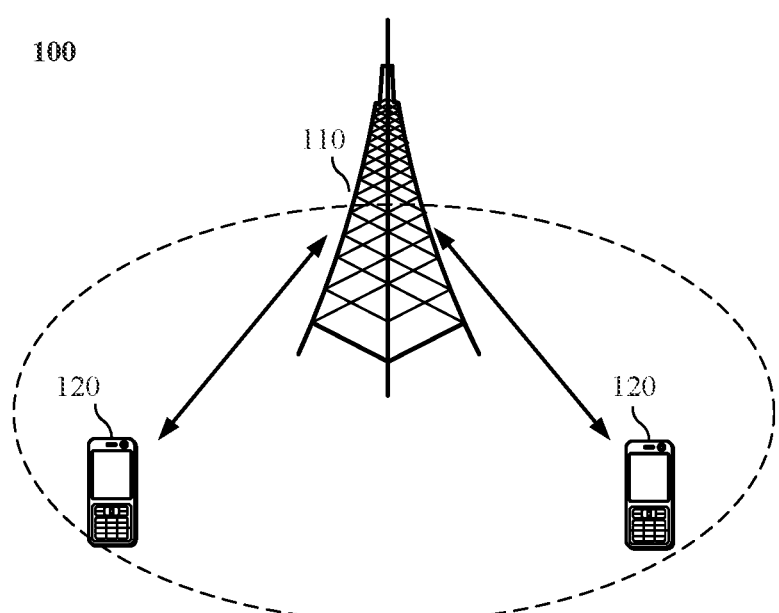
FIG. 1 is a schematic diagram of a communication system architecture according to an embodiment of the disclosure.

For example, the communication system 100 to which the embodiments of the disclosure are applied is as shown in FIG. 1. The communication system 100 may include a network device 110. The network device 110 may be a device communicating with a terminal 120 (or called a communication terminal and the terminal). The network device 110 may provide communication coverage for a specific geographical region and may communicate with the terminal under the coverage. Optionally, the network device 110 may be a Base Transceiver Station (BTS) in a GSM system or a CDMA system, or may also be a NodeB (NB) in a WCDMA system, or may also be an Evolutional Node B (eNB or eNodeB) in an LTE system or a wireless controller in a Cloud Radio Access Network (CRAN). Or the network device may be a mobile switching center, a relay station, an access point, a vehicle device, a wearable device, a concentrator, a switch, a network bridge, a router, a network-side device in a 5G network, a network device in a future evolved PLMN or the like.

The communication system 100 may further include at least one terminal 120 within the coverage of the network device 110. The "terminal" used herein includes, but not limited to, connection via a wired circuit, such as connection via Public Switched Telephone Networks (PSTN), a Digital Subscriber Line (DSL), a digital cable and a direct cable; and/or another data connection/network; and/or a wireless interface, for example, for a cellular network and a Wireless Local Area Network (WLAN) such as a digital television network of a Digital Video Broadcasting-Handheld (DVB-H) network, a satellite network and an Amplitude Modulation-Frequency Modulation (AM-FM) broadcast transmitter; and/or an apparatus of another terminal that is configured to receive/send a communication signal, and/or an Internet of Things (IoT) device. The terminal configured to communicate through the wireless interface may be called a "wireless communication terminal", a "wireless terminal" or a "mobile terminal". Examples of the mobile terminal include, but not limited to, a satellite or cell phone; a Personal Communication System (PCS) terminal that can combine a cellular radiotelephone, data processing, facsimile, and data communications capabilities, a radiotelephone, a pager, an Internet/Intranet access, a Web browser, a memo pad, a calendar, and/or a PDA equipped with a Global Positioning System (GPS) receiver, and a common laptop and/or palm type receiver or some other electronic devices including a transmitter-receiver radiotelephone. The terminal may be an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal in the 5G network, a terminal in the future evolved PLMN or the like.

Optionally, the terminal 120 may perform Device to Device (D2D) communication.

Optionally, the 5G system or 5G network may also be called an NR system or an NR network.

A network device and two terminals are taken as an example, shown in FIG. 1. Optionally, the communication system 100 may include multiple network devices and another number of terminals which may be included under coverage of each network device. There are no limits made thereto in the embodiments of the disclosure.

Optionally, the communication system 100 may further include another network entity such as a network controller and a mobility management entity. There are no limits made thereto in the embodiments of the disclosure.

It is to be understood that the device having the communication function in the network/system in the embodiments of the disclosure may be referred to as a communication device. With the communication system 100 shown in FIG. 1 as an example, the communication device may include the network device 110 and the terminal 120, both of which have the communication function. The network device 110 and the terminal 120 are the above-described specific devices and will not be elaborated herein. The communication device may further include other devices in the communication system 100, such as a network controller, a mobile management entity and other network entities. There are no limits made thereto in the embodiments of the disclosure.

It is to be understood that terms "system" and "network" in the disclosure may be exchanged in the disclosure. In the disclosure, term "and/or" is only an association relationship describing associated objects and represents three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to meet demands of people on the rate, delay, high-speed mobility and energy efficiency of services as well as the diversity and complexity of the services in future life, the 3GPP international standard organizations start to research and develop 5G mobile communication technologies.

The technical solutions in the embodiments of the disclosure are mainly applied to 5G mobile communication systems. Certainly, the technical solutions in the embodiments of the disclosure are not limited to the 5G mobile communication systems, and may also be applied to other types of mobile communication systems. Main application scenarios of the 5G mobile communication technologies include: Enhance Mobile Broadband (eMBB), Ultra Reliable Low Latency Communication (URLLC) and massive Machine Type Communication (mMTC). Descriptions are made below to the main application scenarios in the 5G mobile communication systems.

1) eMBB scenario: the eMBB aims to make users obtain multimedia contents, services and data, with the service demand increasing very rapidly. As the eMBB may be deployed in different scenarios such as rooms, urban areas and rural areas, there is a big difference in service capability and requirement, and the services are required to be analyzed in combination with specific deployment scenarios.

2) URLLC scenario: the URLLC is typically applied to industrial automation, power automation, remote medical operation, traffic safety guarantee and the like.

3) mMTC scenario: typical features of the URLLC include high connection density, small data size, delay insensitive service, low cost and long service life of modules, and the like.

Figure 2:
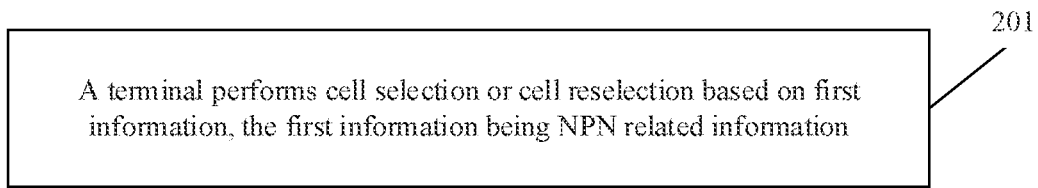
FIG. 2 is a flowchart of a method for cell selection or reselection according to an embodiment of the disclosure.

FIG. 2 is a flowchart of a method for cell selection or reselection according to an embodiment of the disclosure. As shown in FIG. 2, the method for cell selection or reselection may include the following operation.

At the operation 201: a terminal performs cell selection or cell reselection based on first information, the first information being NPN related information.

In the embodiment of the disclosure, the terminal may be any device capable of communicating with a network such as a mobile phone, a tablet computer, a notebook, a vehicle-mounted terminal and a wearable device.

In the embodiment of the disclosure, the terminal may include at least one of followings, a resident terminal and a terminal having a first attribute.

Herein, the resident terminal refers to a terminal in an idle state, i.e., a terminal resided in some cell.

Herein, the terminal having the first attribute may include at least one of followings:

a terminal supporting an NPN, a terminal not supporting an NPN, a terminal supporting a dedicated NPN, a terminal not supporting a dedicated NPN, a terminal supporting a dedicated Tracking Area (TA), a terminal not supporting a dedicated TA, a terminal supporting a dedicated PLMN, a terminal not supporting a dedicated PLMN, a terminal supporting a dedicated cell, a terminal not supporting a dedicated cell, a terminal carrying an NPN supported identifier, and a terminal carrying an NPN non-supported identifier.

It is to be noted that the terminal having the first attribute is not limited to the above several terminals, and may further include at least one of followings:

a terminal supporting a dedicated NPN list, a terminal not supporting a dedicated NPN list, a terminal supporting a dedicated TA list, a terminal not supporting a dedicated TA list, a terminal supporting a dedicated PLMN list, a terminal not supporting a dedicated PLMN list, a terminal supporting a dedicated cell list, a terminal not supporting a dedicated cell list, a terminal carrying an NPN supported identifier, and a terminal carrying an NPN non-supported identifier.

In an embodiment of the disclosure, the first attribute may be determined based on contract-signing information of the terminal, and/or, the first attribute may be determined based on NPN related information stored by the terminal.

In an embodiment of the disclosure, the cell selection is a process that the terminal selects an appropriate cell for residing after being started up (entering a service area from an area without service). The cell selection may also be a process that the terminal enters an idle state upon reception of a Radio Resource Control (RRC) release message and then selects an appropriate cell for residing. The cell reselection is a process that the terminal reselects a serving cell due to factors such as a position change and a signal change in the idle state.

In the NPN scenario, the cell selection or cell reselection needs to consider the NPN related information. Hence, in the embodiment of the disclosure, the terminal performs the cell selection or cell reselection based on the first information (the first information is the NPN related information). The first information may include at least one of followings:

a TA identifier, a TA list, an NPN indication, a PLMN identifier corresponding to the NPN, a PLMN list corresponding to the NPN, a cell identifier corresponding to the NPN, a cell list corresponding to the NPN, a frequency identifier corresponding to the NPN, a frequency list corresponding to the NPN, a TA identifier corresponding to the NPN, and a TA list corresponding to the NPN.

In an embodiment of the disclosure, the origin of the first information includes but not limited to the following two modes:

First mode: the first information is NPN related information stored by the terminal.

Herein, the first information may be determined based on at least one of followings: contract-signing information of the terminal, information stored by the terminal, and information from a core network.

For example, the contract-signing information of the terminal may include related information of the PLMN, and the information stored by the terminal may include a white list, a black list and the like.

Second mode: the first information is NPN related information from a first network device.

Herein, the first network device may be a base station.

Herein, the first information may be carried in at least one of following messages: an RRC release message, an RRC-dedicated message, a Network Access Server (NAS)-dedicated message, and system information.

The RRC release message may be sent by the base station to the terminal.

The RRC-dedicated message may be a special RRC message between the terminal and the network (the message is a novel RRC message). Or, the RRC-dedicated message may be a UE-dedicated RRC message (such as an RRC message dedicated to the UE or an UE group to which the UE belongs).

The NAS-dedicated message may be a special NAS message between the terminal and the network (the message is a novel NAS message), or, the NAS-dedicated message may be a UE-dedicated NAS message.

In an embodiment of the disclosure, the terminal may determine whether a first cell or first frequency is an appropriate target cell or target frequency based on the first information; and/or, the terminal may determine whether the first cell or first frequency is an appropriate candidate target cell or candidate target frequency based on the first information; and/or, the terminal may determine whether to firstly select the first cell or first frequency based on the first information.

The first cell or first frequency may be a candidate cell or candidate frequency during the cell selection or cell reselection.

For example, during the cell selection or cell reselection, multiple candidate cells or candidate frequencies may be determined based on a search result. For each candidate cell or candidate frequency, i.e., the first cell or first frequency, the terminal needs to determine whether the first cell or first frequency is the appropriate target cell or target frequency, and/or, determine whether the first cell or first frequency is the appropriate candidate target cell or candidate target frequency, and/or, determine whether to firstly select the first cell or first frequency.

In an implementation, the terminal may determine a cell or frequency carrying NPN information, or, a cell or frequency not carrying NPN information, or, a cell or frequency not supporting an NPN, or, a non-NPN cell or frequency as the appropriate target cell or target frequency. And/or, the terminal may determine the cell or frequency not supporting the NPN, or, the cell or frequency not carrying the NPN information, or, the non-NPN cell or frequency as the candidate target cell or candidate target frequency. And/or, the terminal may firstly select the cell or frequency carrying the NPN information, or, the cell or frequency not carrying the NPN information, or, the cell or frequency not supporting the NPN, or, the non-NPN cell or frequency.

Further, the terminal is a terminal of a first type. The terminal of the first type may include at least one of followings: a terminal without any attribute, all resident terminals in the first cell, the NPN non-supported terminal, and a terminal having a first attribute different from an NPN attribute of the first cell.

In another implementation, the terminal may determine a cell or frequency carrying NPN information, or, a cell or frequency not carrying NPN information, or, a cell or frequency supporting the NPN, or, a cell or frequency of the NPN as the appropriate target cell or target frequency. And/or, the terminal may determine the cell or frequency carrying the NPN information, or, the cell or frequency not carrying the NPN information, or, the cell or frequency supporting the NPN, or, the cell or frequency of the NPN as the appropriate candidate target cell or candidate target frequency. And/or, the terminal may firstly select the cell or frequency carrying the NPN information, or, the cell or frequency not carrying the NPN information, or, the cell or frequency supporting the NPN, or, the cell or frequency of the NPN.

Further, the terminal is a terminal of a second type. The terminal of the second type may include at least one of followings: a terminal without any attribute, all resident terminals in the first cell, a terminal supporting an NPN, and a terminal having a first attribute different from an NPN attribute of the first cell.

The technical solutions in the embodiments of the disclosure will be described below in combination with specific application examples. It is to be noted that the application examples below are merely for explaining the technical solutions of the disclosure, but the scope of protection of the disclosure is not limited to the following application examples.

First Application Example

Figure 3:
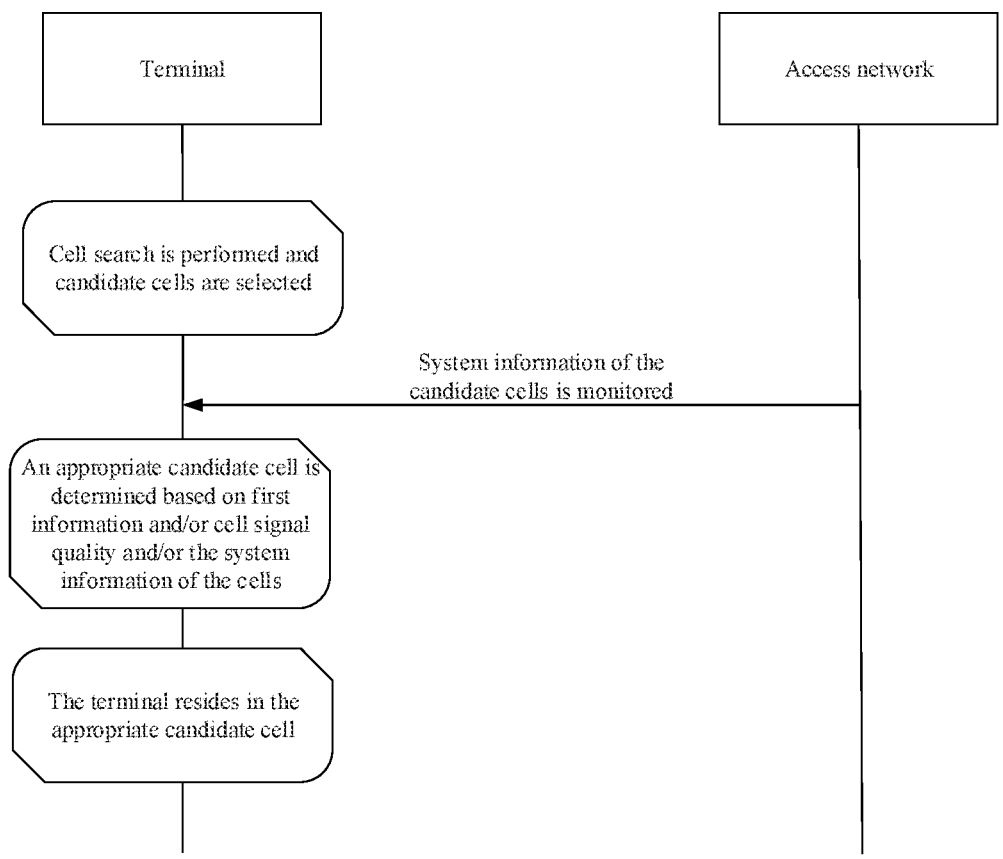
FIG. 3 is a flowchart of cell selection according to an embodiment of the disclosure.

Referring to FIG. 3, the application example may include the following operations.

1) A terminal performs cell search and selects candidate cells.

Herein, the terminal may search for frequencies within a supported bandwidth and acquire and take several cells with the strongest signal quality as the candidate cells. Or, in a case that a cell list to be searched is stored in the terminal in advance, the terminal may sequentially search in the cell list for cells to take the cells as the candidate cells.

2) For each candidate cell, the terminal monitors system information of the candidate cell.

3) For each candidate cell, the terminal determines whether the candidate cell is an appropriate candidate cell based on first information and/or signal quality of the candidate cell and/or system information of the candidate cell.

The first information may be NPN related information. The first information may include at least one of followings: a TA identifier, a TA list, an NPN indication, a PLMN identifier corresponding to the NPN, a PLMN list corresponding to the NPN, a cell identifier corresponding to the NPN, a cell list corresponding to the NPN, a frequency identifier corresponding to the NPN, a frequency list corresponding to the NPN, a TA identifier corresponding to the NPN, and a TA list corresponding to the NPN.

The first information in the above solutions is configured to determine configuration information of the cell selection or cell reselection, and/or, configured to determine configuration information of cell network features.

In the above solutions, the terminal may include at least one of followings: a resident terminal and a terminal having a first attribute.

It is to be noted that the terminal having the first attribute may refer to the descriptions in the method for cell selection or reselection, and will not be elaborated herein.

In an implementation, the first attribute may be determined based on contract-signing information of the terminal, and/or, determined based on information stored by the terminal, and/or, determined based on NPN related information stored by the terminal.

In an implementation, the first information may be determined based on the contract-signing information of the terminal and/or the information stored by the terminal. For example, the contract-signing information of the terminal may include related information of the PLMN, and the information stored by the terminal may include a white list, a black list and the like.

In an implementation, the first information may be determined based on the contract-signing information of the terminal and/or the information stored by the terminal and/or other information. The other information may be, for example, network indication information.

In the embodiment of the disclosure, the terminal may determine, based on the first information, whether to firstly select the candidate cell, and/or whether the candidate cell is an appropriate candidate cell, and/or whether to further use a Reselection/Selection (R/S) criterion on the candidate cell.

Optionally, the terminal may firstly select a cell or frequency carrying NPN information, or, a cell or frequency not carrying NPN information, or, a cell or frequency not supporting an NPN, or, a non-NPN cell or frequency. Further, the terminal of the first type may firstly select the cell or frequency carrying the NPN information, or, the cell or frequency not carrying the NPN information, or, the cell or frequency not supporting the NPN, or, the non-NPN cell or frequency.

Optionally, the terminal may firstly select a cell or frequency carrying NPN information, or, a cell or frequency not carrying NPN information, or, a cell or frequency supporting the NPN, or, a cell or frequency of the NPN. Further, the terminal of the second type may firstly select the cell or frequency carrying the NPN information, or, the cell or frequency not carrying the NPN information, or, the cell or frequency supporting the NPN, or, the cell or frequency of the NPN.

The terminal of the first type may include but not limited to at least one of followings: a terminal without any attribute, all resident terminals of the cell, a terminal not supporting an NPN, and a terminal having a first attribute different from an NPN attribute of the cell.

The terminal of the second type may include but not limited to at least one of followings: a terminal without any attribute, all resident terminals of the cell, a terminal not supporting an NPN, and a terminal having a first attribute as same as an NPN attribute of the cell.

For example, in response to determining based on the first information that the candidate cell is an NPN cell, the NPN non-supported terminal may determine that the candidate cell is not an appropriate candidate cell. Further, the terminal does not measure the candidate cell.

For example, it may be determined based on the first attribute that the terminal is a dedicated-PLMN non-supported terminal, and a PLMN identifier corresponding to the dedicated-PLMN is X. When the terminal determines based on the first information that the candidate cell is an NPN cell and a PLMN identifier corresponding to the NPN cell is N=X, it may be considered, during the cell reselection/selection, that the candidate cell is not an appropriate candidate cell, and/or the candidate cell is not taken as the firstly selected candidate cell. When the terminal skips the candidate cell, a next cell in the cell list may be selected to determine the cell selection.

For example, it may be determined based on the first attribute that the terminal is an NPN supported terminal. When the terminal determines based on the first information that the candidate cell is an NPN cell, the terminal may adjust a priority in the cell list based on the NPN information, and preferentially select a cell supporting the NPN.

For example, it may be determined based on the first attribute that the terminal is a terminal without any attribute. When the terminal determines based on the first information that the candidate cell is an NPN cell, it may be considered, during the cell reselection/selection, that the candidate cell is taken as a candidate cell with a low priority.

4) After the candidate cell is determined as an appropriate candidate cell, the cell selection is ended, and the terminal resides in the appropriate candidate cell for transceiving data.

Second Application Example

1) A terminal selects candidate cells, reads system information of the candidate cells, and finally selects a resident cell.

2) After the terminal resides in the cell successfully, the terminal continuously measures a signal of the resident cell.

3) Along with increasingly poor signal quality of the terminal in the present resident cell due to mobility of the terminal and the like, the terminal determines to start measurement on a neighboring cell when a certain threshold (such as a co-frequency measurement start threshold, and a pilot frequency measurement start threshold) is met.

4) For each candidate neighboring cell (referred to as a candidate neighboring cell), the terminal determines, based on first information and/or signal quality of the candidate neighboring cell, whether the candidate neighboring cell is an appropriate candidate neighboring cell.

The first information is NPN related information. The first information may include at least one of followings: a TA identifier, a TA list, an NPN indication, a PLMN identifier corresponding to the NPN, a PLMN list corresponding to the NPN, a cell identifier corresponding to the NPN, a cell list corresponding to the NPN, a frequency identifier corresponding to the NPN, a frequency list corresponding to the NPN, a TA identifier corresponding to the NPN, and a TA list corresponding to the NPN.

In the above solutions, the terminal may include at least one of followings: a resident terminal and a terminal having a first attribute.

It is to be noted that the terminal having the first attribute may refer to the descriptions in the method for cell selection or reselection, and will not be elaborated herein.

In an implementation, the first attribute may be determined based on contract-signing information of the terminal, and/or, determined based on information stored by the terminal, and/or, determined based on NPN related information stored by the terminal.

In an implementation, the first information may be acquired by the terminal from a previous resident cell and/or a present resident cell and/or a previously connected cell. Further, these cells may acquire the first information through a core network.

Figure 4:
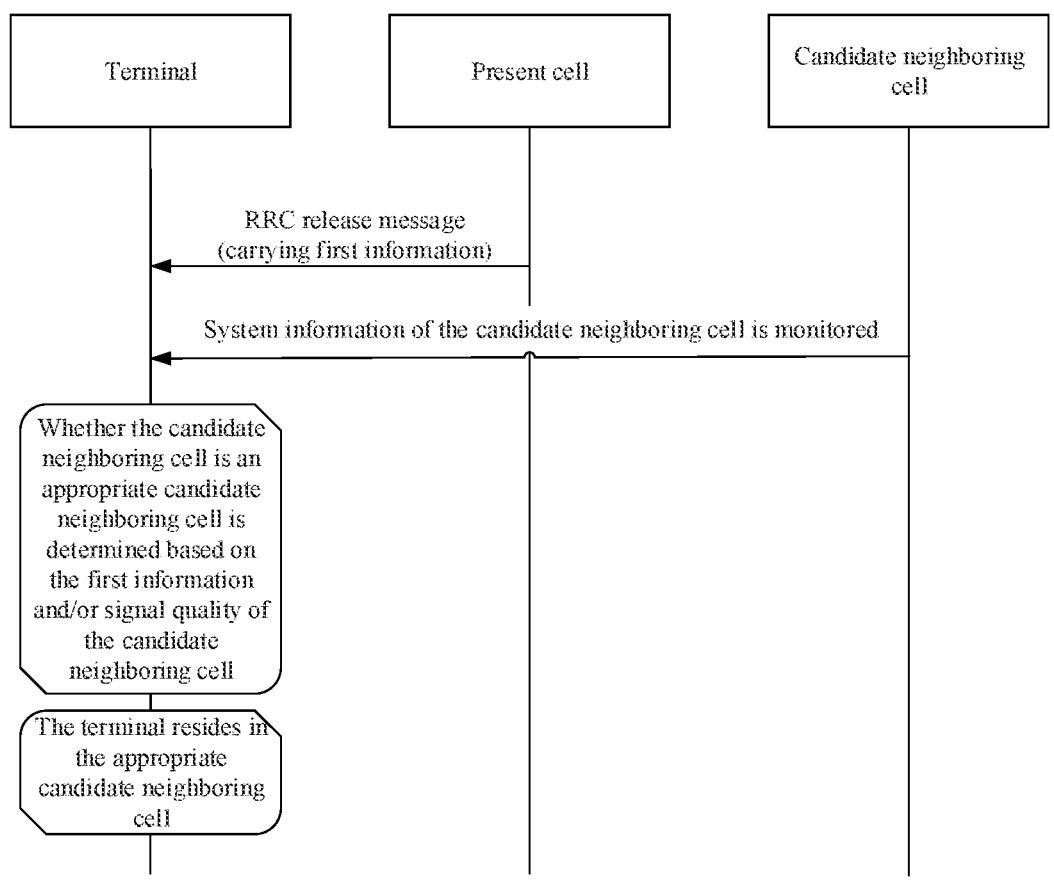
FIG. 4 is a flowchart of cell reselection according to an embodiment of the disclosure.

Referring to FIG. 4, during the cell reselection, a present access network may send an RRC release message to the terminal, the RRC release message carrying the first information. After determining to start the measurement on the neighboring cell, the terminal may monitor system information of candidate access networks (cells or frequencies), one or more candidate cells or frequencies being provided, and determine, for each candidate neighboring cell, whether the candidate neighboring cell is an appropriate candidate neighboring cell based on the first information and/or signal quality of the candidate neighboring cell. At last, the terminal may reside in the appropriate candidate neighboring cell.

In an embodiment of the disclosure, the terminal may determine, based on the first information, whether to firstly select the candidate neighboring cell, and/or determine whether the candidate neighboring cell is an appropriate candidate neighboring cell, and/or determine whether to further use an R/S criterion on the candidate neighboring cell.

Optionally, the terminal may firstly select a cell or frequency carrying NPN information, or, a cell or frequency not carrying NPN information, or, a cell or frequency not supporting an NPN, or, a non-NPN cell or frequency. Further, the terminal of the first type may firstly select the cell or frequency carrying the NPN information, or, the cell or frequency not carrying the NPN information, or, the cell or frequency not supporting the NPN, or, the non-NPN cell or frequency.

Optionally, the terminal may firstly select a cell or frequency carrying NPN information, or, a cell or frequency not carrying NPN information, or, a cell or frequency supporting an NPN, or, a cell or frequency of the NPN. The terminal of the second type may firstly select the cell or frequency carrying the NPN information, or, the cell or frequency not carrying the NPN information, or, the cell or frequency supporting the NPN, or, the cell or frequency of the NPN.

The terminal of the first type may include but not limited to at least one of followings: a terminal without any attribute, all resident terminals of the cell, a terminal not supporting an NPN, and a terminal having a first attribute different from an NPN attribute of the cell.

The terminal of the second type may include but not limited to at least one of followings: a terminal without any attribute, all resident terminals of the cell, a terminal not supporting an NPN, and a terminal having a first attribute as same as an NPN attribute of the cell.

5) When the candidate neighboring cell is an appropriate candidate neighboring cell, the cell reselection is performed based on signal quality of a serving cell and signal quality of the candidate neighboring cell.

In addition, whether the cell reselection is performed on the candidate neighboring cell may also be determined based on the first information in this operation.

For example, the candidate neighboring cell may be ignored.

For example, in a case where the terminal does not support an NPN and the candidate neighboring cell is an NPN cell, the determination of the R/S criterion may be not performed on the candidate neighboring cell, and a next cell in the cell list may be selected to determine the cell reselection. It is to be noted that no matter whether the neighboring cell is an appropriate cell or even if the neighboring cell is an appropriate cell, the terminal does not reselect the neighboring cell during the cell reselection.

6) When the candidate neighboring cell meets a determination condition of the cell reselection, the terminal reselects the candidate neighboring cell.

Third Application Example

1) A terminal selects candidate cells, reads system information of the candidate cells, and finally selects a resident cell.

2) After the terminal resides in the cell successfully, the terminal continuously measure a signal of the resident cell.

3) Along with increasingly poor signal quality of the terminal in the presently resident cell due to mobility of the terminal and the like, the terminal determines to start measurement on a neighboring cell when a certain threshold (such as a co-frequency measurement start threshold, and a pilot frequency measurement start threshold) is met.

4) For each candidate neighboring cell, the terminal determines, based on first information and/or signal quality of the candidate neighboring cell, whether the candidate neighboring cell is an appropriate candidate neighboring cell.

The first information is NPN related information. The first information may include at least one of followings: a TA identifier, a TA list, an NPN indication, a PLMN identifier corresponding to an NPN, a PLMN list corresponding to the NPN, a cell identifier corresponding to the NPN, a cell list corresponding to the NPN, a frequency identifier corresponding to the NPN, a frequency list corresponding to the NPN, a TA identifier corresponding to the NPN, and a TA list corresponding to the NPN.

In the above solutions, the terminal may include at least one of followings: a resident terminal and a terminal having a first attribute.

It is to be noted that the terminal having the first attribute may refer to the descriptions in the method for cell selection or reselection, and will not be elaborated herein.

In an implementation, the first attribute may be determined based on contract-signing information of the terminal, and/or, the first attribute may be determined based on NPN related information stored by the terminal.

In an implementation, the first information may be NPN related information from a first network device. The first network device may be a base station, including but not limited one of the followings: a base station of a serving cell, or a base station of a neighboring cell. Herein, the first information may be carried in at least one of the following messages: an RRC release message, an RRC-dedicated message, an NAS-dedicated message, and system information.

For example, when determining to start the measurement on the neighboring cell, the user may read system information of the candidate neighboring cell and acquire first information from the system information, thereby determining NPN related information of the candidate neighboring cell.

For example, the terminal may continuously read system information of the resident cell, and the terminal may acquire first information from the system information of the resident cell, thereby determining NPN related information of the resident cell.

In an embodiment of the disclosure, the terminal may determine, based on the first information, whether to firstly select the candidate neighboring cell, and/or whether the candidate neighboring cell is an appropriate candidate neighboring cell, and/or whether to further use an R/S criterion on the candidate neighboring cell.

Optionally, the terminal may firstly select a cell or frequency carrying NPN information, or, a cell or frequency not carrying NPN information, or, a cell or frequency not supporting an NPN, or, a non-NPN cell or frequency. Further, the terminal of the first type may firstly select the cell or frequency carrying the NPN information, or, the cell or frequency not carrying the NPN information, or, the cell or frequency not supporting the NPN, or, the non-NPN cell or frequency.

Optionally, the terminal may firstly select a cell or frequency carrying NPN information, or, a cell or frequency not carrying NPN information, or, a cell or frequency supporting an NPN, or, a cell or frequency of the NPN. Further, the terminal of the second type may firstly select the cell or frequency carrying the NPN information, or, the cell or frequency not carrying the NPN information, or, the cell or frequency supporting the NPN, or, the cell or frequency of the NPN.

The terminal of the first type may include but not limited to at least one of followings: a terminal without any attribute, all resident terminals of the cell, a terminal not supporting an NPN, and a terminal having a first attribute different from an NPN attribute of the cell.

The terminal of the second type may include but not limited to at least one of followings: a terminal without any attribute, all resident terminals of the cell, a terminal not supporting an NPN, and a terminal having a first attribute as same as an NPN attribute of the cell.

5) When the candidate neighboring cell is an appropriate candidate neighboring cell, the cell reselection is performed based on signal quality of a serving cell and signal quality of the candidate neighboring cell.

In addition, whether the cell reselection is performed on the candidate neighboring cell may also be determined based on the first information in this operation.

For example, the candidate neighboring cell may be ignored.

For example, in a case where the terminal does not support an NPN and the candidate neighboring cell is an NPN cell, the determination of the R/S criterion may be not performed on the candidate neighboring cell, and a next cell in the cell list may be selected to determine the cell reselection. It is to be noted that no matter whether the neighboring cell is an appropriate cell or even if the neighboring cell is an appropriate cell, the terminal does not reselect the neighboring cell during the cell reselection.

6) When the candidate neighboring cell meets a determination condition of the cell reselection, the terminal reselects the candidate neighboring cell.

Fourth Application Example

1) A first network device acquires first information of a neighboring cell of a serving cell.

Herein, the first network device may acquire the first information of the neighboring cell in at least one of the following modes.

First mode: the first network device acquires the first information of the neighboring cell from a core network.

Second mode: the first network device acquires the first information of the neighboring cell from other access network devices.

Herein, the first network device may be a base station, including but not limited one of the followings: a base station of a serving cell, or a base station of a neighboring cell.

2) The first network device carries the first information of the neighboring cell in system information of a present cell.

When the first network device is the base station of the serving cell, the first network device may carry the first information of the neighboring cell through system information of the serving cell.

When the first network device is the base station of the neighboring cell, the first network device may carry the first information of the neighboring cell through system information of the neighboring cell.

In an implementation, the system information may include Minimum System Information (MSI) and Other System Information (OSI). The MSI may carry scheduling information of the OSI, and a target System Information Block (SIB) in the OSI may carry the first information of the neighboring cell.

Further, the first information of the neighboring cell may be carried in any SIB (such as SIB3, SIB4, SIB5, SIB6, SIB7, SIB8 and SIB9) of the OSI, or dispersively carried in at least one SIB, or carried in a newly added SIB.

3) The terminal acquires the first information of the neighboring cell according to a mode that the system information is broadcast or a mode that the terminal requests the system information.

Figure 5:
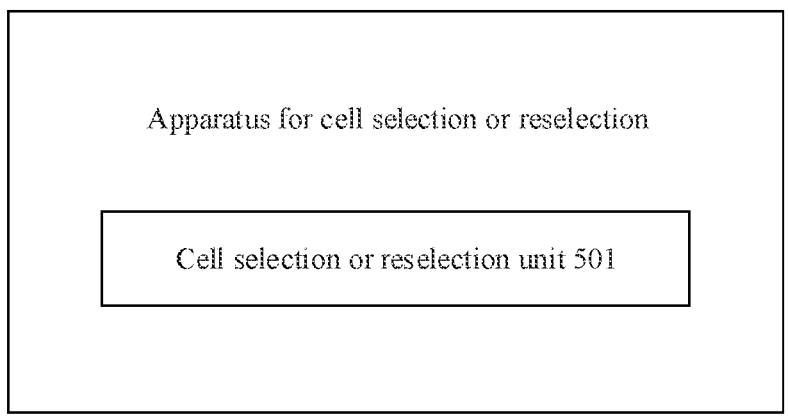
FIG. 5 is a schematic structure diagram of an apparatus for cell selection or reselection according to an embodiment of the disclosure.

FIG. 5 is a schematic structure diagram of an apparatus for cell selection or reselection according to an embodiment of the disclosure. As shown in FIG. 5, the cell selection or reselection apparatus may include: a cell selection or reselection unit 501.

The cell selection or reselection unit 501 is configured to perform cell selection or cell reselection based on first information, the first information being NPN related information.

In an implementation, the first information may include at least one of followings:

a TA identifier, a TA list, an NPN indication, a PLMN identifier corresponding to an NPN, a PLMN list corresponding to the NPN, a cell identifier corresponding to the NPN, a cell list corresponding to the NPN, a frequency identifier corresponding to the NPN, a frequency list corresponding to the NPN, a TA identifier corresponding to the NPN, and a TA list corresponding to the NPN.

In an implementation, the terminal may include at least one of followings:

a resident terminal and a terminal having a first attribute.

In an implementation, the terminal having the first attribute may include at least one of followings:

a terminal supporting an NPN, a terminal not supporting an NPN, a terminal supporting a dedicated NPN, a terminal not supporting a dedicated NPN, a terminal supporting a dedicated TA, a terminal not supporting a dedicated TA, a terminal supporting a dedicated PLMN, a terminal not supporting a dedicated PLMN, a terminal supporting a dedicated cell, a terminal not supporting a dedicated cell, a terminal carrying an NPN supported identifier, and a terminal carrying an NPN non-supported identifier.

It is to be noted that the terminal having the first attribute is not limited to the above several terminals, and may further include at least one of followings:

a terminal supporting a dedicated NPN list, a terminal not supporting a dedicated NPN list, a terminal supporting a dedicated TA list, a terminal not supporting a dedicated TA list, a terminal supporting a dedicated PLMN list, a terminal not supporting a dedicated PLMN list, a terminal supporting a dedicated cell list, a terminal not supporting a dedicated cell list, a terminal carrying an NPN supported identifier, and a terminal carrying an NPN non-supported identifier.

In an implementation, the first attribute may be determined based on contract-signing information of the terminal, and/or, the first attribute may be determined based on NPN related information stored by the terminal.

In an implementation, the first information may be NPN related information stored by the terminal.

In an implementation, the first information may be determined based on at least one of followings:

the contract-signing information of the terminal, information stored by the terminal, and information from a core network.

In an implementation, the first information may be NPN related information from a first network device.

In an implementation, the first information may be carried in at least one of the messages: an RRC release message, an RRC-dedicated message, an NAS-dedicated message, and system information.

In an implementation, the first network device may be a base station.

In an implementation, the cell selection or reselection unit 501 is configured to determine, based on the first information, whether a first cell or first frequency is an appropriate target cell or target frequency, and/or whether the first cell or first frequency is an appropriate candidate target cell or candidate target frequency, and/or whether to firstly select the first cell or first frequency.

The first cell or first frequency may be a candidate cell or candidate frequency during the cell selection or cell reselection.

In an implementation, the cell selection or reselection unit 501 is configured to determine a cell or frequency carrying NPN information as the appropriate target cell or target frequency.

In an implementation, the cell selection or reselection unit 501 is configured to determine a cell or frequency not carrying NPN information as the appropriate target cell or target frequency.

In an implementation, the cell selection or reselection unit 501 is configured to determine a cell or frequency not supporting an NPN as the appropriate target cell or target frequency.

In an implementation, the cell selection or reselection unit 501 is configured to determine a non-NPN cell or frequency as the appropriate target cell or target frequency.

In an implementation, the cell selection or reselection unit 501 is configured to firstly select the cell or frequency carrying the NPN information.

In an implementation, the cell selection or reselection unit 501 is configured to firstly select the cell or frequency not carrying the NPN information.

In an implementation, the cell selection or reselection unit 501 is configured to firstly select the cell or frequency not supporting the NPN.

In an implementation, the cell selection or reselection unit 501 is configured to firstly select the non-NPN cell or frequency.

In an implementation, the terminal may be a terminal of a first type.

In an implementation, the terminal of the first type may include at least one of followings: a terminal without any attribute, all resident terminals in the first cell, a terminal not supporting an NPN, and a terminal having a first attribute different from an NPN attribute of the first cell.

In an implementation, the cell selection or reselection unit 501 is configured to determine a cell or frequency carrying NPN information as the appropriate target cell or target frequency.

In an implementation, the cell selection or reselection unit 501 is configured to determine a cell or frequency not carrying NPN information as the appropriate target cell or target frequency.

In an implementation, the cell selection or reselection unit 501 is configured to determine a cell or frequency supporting an NPN as the appropriate target cell or target frequency.

In an implementation, the cell selection or reselection unit 501 is configured to determine a cell or frequency of an NPN as the appropriate target cell or target frequency.

In an implementation, the cell selection or reselection unit 501 is configured to firstly select the cell or frequency carrying the NPN information.

In an implementation, the cell selection or reselection unit 501 is configured to firstly select the cell or frequency not carrying the NPN information.

In an implementation, the cell selection or reselection unit 501 is configured to firstly select the cell or frequency supporting the NPN.

In an implementation, the cell selection or reselection unit 501 is configured to firstly select the cell or frequency of the NPN.

In an implementation, the terminal may be a terminal of a second type.

In an implementation, the terminal of the second type may include at least one of followings: a terminal without any attribute, all resident terminals in the first cell, a terminal not supporting an NPN, and a terminal having a first attribute as same as an NPN attribute of the first cell.

It is to be understood by the person skilled in the art that related descriptions on the above apparatus for cell selection or reselection in the embodiments of the disclosure may be understood with reference to the related descriptions on the method for cell selection or reselection in the embodiments of the disclosure.

Figure 6:
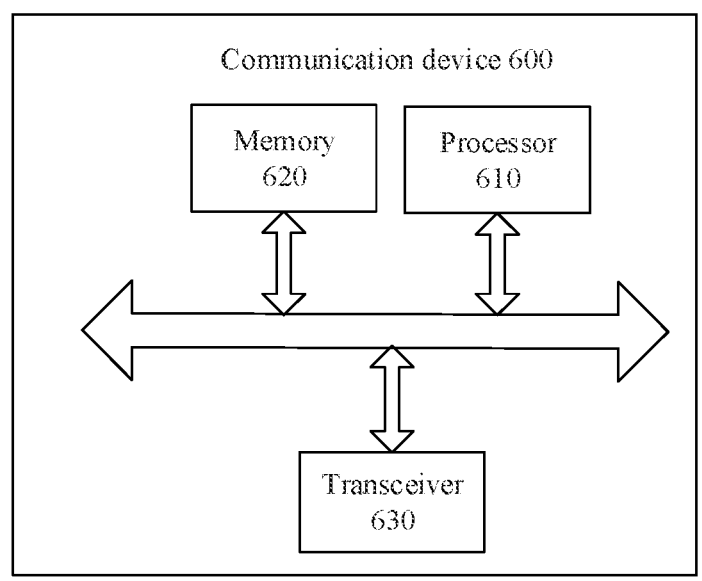
FIG. 6 is a schematic structure diagram of a communication device according to an embodiment of the disclosure.

FIG. 6 is a schematic structure diagram of a communication device 600 according to an embodiment of the disclosure. The communication device may be a terminal. The communication device 600 shown in FIG. 6 includes a processor 610. The processor 610 may call a computer program from memory and run the program, to implement the method in the embodiments of the disclosure.

Optionally, as shown in FIG. 6, the communication device 600 may further include the memory 620. The processor 610 may call and run the computer program in the memory 620 to implement the method in the embodiments of the disclosure.

The memory 620 may be a separate device independent of the processor 610, and may also be integrated in the processor 610.

Optionally, as shown in FIG. 6, the communication device 600 may further include a transceiver 630, and the processor 610 may control the transceiver 630 to communicate with another device, specifically sending information or data to the other device or receiving information or data sent by the other device.

The transceiver 630 may include a transmitter and a receiver. The transceiver 630 may further include an antenna; and there may be one or more antennas.

Optionally, the communication device 600 may be the network device of the embodiments of the disclosure, and the communication device 600 may implement corresponding flows implemented by the network device in each method of the embodiments of the disclosure. For simplicity, elaborations are omitted herein.

Optionally, the communication device 600 may be the mobile terminal/terminal of the embodiments of the disclosure, and the communication device 600 may implement corresponding flows implemented by the mobile terminal/terminal in each method of the embodiments of the disclosure. For simplicity, elaborations are omitted herein.

Figure 7:
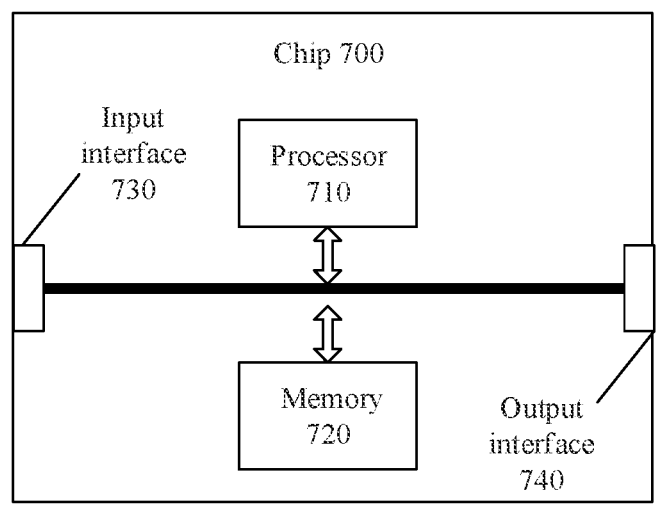
FIG. 7 is a schematic structure diagram of a chip according to an embodiment of the disclosure.

FIG. 7 is a schematic structure diagram of a chip according to an embodiment of the disclosure. The chip 700 shown in FIG. 7 includes a processor 710. The processor 710 may call a computer program from memory and run the program, to implement the method in the embodiments of the disclosure.

Optionally, as shown in FIG. 7, the chip 700 may further include memory 720. The processor 710 may call and run the computer program in the memory 720 to implement the method in the embodiments of the disclosure.

The memory 720 may be a separate device independent of the processor 710, and may also be integrated in the processor 710.

Optionally, the chip 700 may further include an input interface 730. The processor 710 may control the input interface 730 to communicate with another device or chip, specifically acquiring information or data sent by the other device or chip.

Optionally, the chip 700 may further include an output interface 740. The processor 710 may control the output interface 740 to communicate with another device or chip, specifically outputting information or data to the other device or chip.

Optionally, the chip may be applied to the network device in the embodiments of the disclosure, and the chip may implement corresponding flows implemented by the network device in each method of the embodiments of the disclosure. For simplicity, elaborations are omitted herein.

Optionally, the chip may be applied to the mobile terminal/terminal in the embodiments of the disclosure, and the chip may implement corresponding flows implemented by the mobile terminal/terminal in each method of the embodiments of the disclosure. For simplicity, elaborations are omitted herein.

It is to be understood that the chip mentioned in the embodiments of the disclosure may be a chip, which may also be called a system-level chip, a system chip, a chip system or a system on chip, etc.

Figure 8:
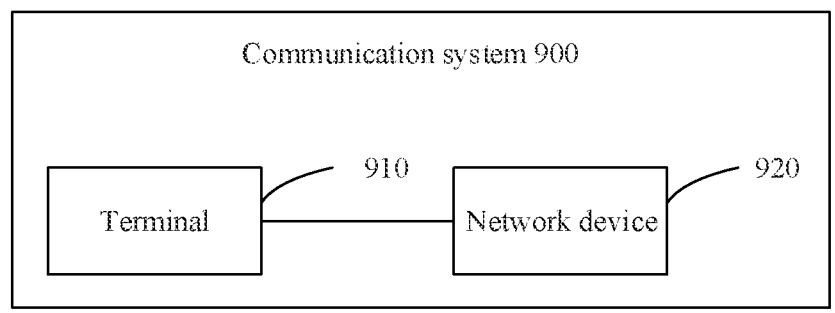
FIG. 8 is a schematic block diagram of a communication system according to an embodiment of the disclosure.

FIG. 8 is a schematic block diagram of a communication system 900 according to an embodiment of the disclosure. As shown in FIG. 8, the communication system 900 includes: a terminal 910 and a network device 920.

The terminal 910 may be configured to implement corresponding functions implemented by the terminal in the above method, and the network device 920 may be configured to implement corresponding functions implemented by the terminal in the above method. For ease of briefness, details are not elaborated.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be an ROM, a Programmable ROM (PROM), an Erasable PROM (EPROM), an Electrically EPROM (EEPROM) or a flash memory. The volatile memory may be an RAM, and is used as an external high-speed cache. It is For example, but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is taken as an example and unlimitedly described. For example, the memory in the embodiment of the disclosure may further be a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM), etc. In other words, the memory described in the embodiment of the disclosure includes but not limited to these and any other appropriate types of memories.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal in the embodiments of the disclosure, and the computer program enables a computer to execute corresponding flows implemented by the mobile terminal/terminal in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal in the embodiments of the disclosure, and the computer program instruction enables the computer to execute corresponding flows implemented by the mobile terminal/terminal in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal in the embodiments of the disclosure, and the computer program runs in the computer to enable the computer to execute corresponding flows implemented by the mobile terminal/terminal in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disc.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for cell selection or reselection performed by a terminal after being started up or entering a service area from an area without service, comprising:
performing, by the terminal, cell selection or cell reselection based on first information received from a base station, the first information being Non-Public Network (NPN) related information, the first information comprising a Tracking Area (TA) identifier corresponding to the NPN, wherein the terminal having a first attribute comprising the terminal supporting an NPN, and said performing further comprising:
determining, by the terminal, whether to firstly select a first cell or first frequency based on the first information, wherein the first cell or first frequency is a candidate cell or frequency during the cell selection or cell reselection; and
determining, by the terminal, whether the first candidate cell or first frequency is the appropriate target cell or target frequency based on the first information further comprising determining, by the terminal, a cell or frequency of an NPN as the appropriate target cell.

2. The method of claim 1, wherein the first information further comprising:
a cell identifier corresponding to the NPN.

3. The method of claim 1, wherein the first information is carried in system information.

4. The method of claim 1, wherein performing, by the terminal, the cell selection or cell reselection based on the first information comprises:
determining, by the terminal, whether a first cell is an appropriate target cell based on the first information.

5. An apparatus for cell selection or reselection, comprising:
a processor and memory, wherein the memory is configured to store a computer program, and the processor is configured to call and run the computer program stored in the memory to implement a method comprising:
performing cell selection or cell reselection based on first information received from a base station, the first information being Non-Public Network (NPN) related information, the first information comprising a Tracking Area (TA) identifier corresponding to the NPN,
wherein the terminal having a first attribute comprising the terminal supporting an NPN, and said cell selection or reselection unit further configured to:
determine, by the terminal, whether to firstly select a first cell or first frequency based on the first information, wherein the first cell or first frequency is a candidate cell or frequency during the cell selection or cell reselection; and
determine, by the terminal, whether the first candidate cell or first frequency is the appropriate target cell or target frequency based on the first information, wherein said cell selection or reselection unit further configured to determine, by the terminal, a cell or frequency of an NPN as the appropriate target cell.

6. The apparatus of claim 5, wherein the first information further comprises:
a cell identifier corresponding to the NPN.

7. The apparatus of claim 5, wherein the first information is carried in system information.

8. The apparatus of claim 5, wherein the processor is configured to:
determine whether a first cell is an appropriate target cell based on the first information.

9. A chip, comprising a processor configured to call and run a computer program in memory to enable a device installed with the chip to implement the method of claim 1.

10. A non-transitory computer-readable storage medium, configured to store a computer program enabling a computer to implement a method comprising:
performing cell selection or cell reselection based on first information received from a base station, the first information being Non-Public Network (NPN) related information, the first information comprising a Tracking Area (TA) identifier corresponding to the NPN, wherein the terminal having a first attribute comprising the terminal supporting an NPN, and said performing further comprising:
determining, by the terminal, whether to firstly select a first cell or first frequency based on the first information, wherein the first cell or first frequency is a candidate cell or frequency during the cell selection or cell reselection; and
determining, by the terminal, whether the first candidate cell or first frequency is the appropriate target cell or target frequency based on the first information further comprising determining, by the terminal, a cell or frequency of an NPN as the appropriate target cell.

11. The non-transitory computer-readable storage medium of claim 10, wherein the first information further comprises:
a cell identifier corresponding to the NPN.

* * * * *